United States Patent [19]
Frank

[11] Patent Number: 5,706,661
[45] Date of Patent: Jan. 13, 1998

[54] APPARATUS AND METHOD FOR CONTROLLING THE CONSISTENCY AND QUALITY OF A FROZEN CARBONATED BEVERAGE PRODUCT

[76] Inventor: Jimmy L. Frank, 17 Woodsborough, Houston, Tex. 77055

[21] Appl. No.: 536,991

[22] Filed: Sep. 29, 1995

[51] Int. Cl.⁶ ............................. F25C 1/18; A23L 2/00
[52] U.S. Cl. ........................ 62/70; 62/306; 99/323.2; 426/67
[58] Field of Search ......................... 62/136, 306, 69, 62/70; 99/323.2; 222/52; 426/67, 312

[56] References Cited

U.S. PATENT DOCUMENTS

| | | | |
|---|---|---|---|
| Re. 32,360 | 2/1987 | Martineau | 62/127 |
| 3,180,106 | 4/1965 | Brandt et al. | 62/177 |
| 3,279,205 | 10/1966 | Stoelting | 62/135 |
| 3,296,817 | 1/1967 | Stoelting | 62/225 |
| 3,298,190 | 1/1967 | Harker | 62/136 |
| 3,410,103 | 11/1968 | Cornelius | 62/136 |
| 3,460,713 | 8/1969 | Cornelius | 222/1 |
| 3,497,115 | 2/1970 | Cornelius | 222/544 |
| 3,519,910 | 7/1970 | Pfaff et al. | 318/218 |
| 3,600,657 | 8/1971 | Pfaff | 318/218 |
| 3,608,779 | 9/1971 | Cornelius | 222/54 |
| 3,678,752 | 7/1972 | Dellert | 73/389 |
| 3,698,203 | 10/1972 | Stoelting | 62/136 |
| 3,787,145 | 1/1974 | Keyes et al. | 417/250 |
| 3,823,571 | 7/1974 | Smith et al. | 62/136 |
| 3,934,427 | 1/1976 | Keyes | 62/342 |
| 3,939,667 | 2/1976 | Halverson | 62/188 |
| 3,969,531 | 7/1976 | Cornelius | 426/319 |
| 3,989,492 | 11/1976 | Keyes | 62/136 |
| 3,995,770 | 12/1976 | Schwitters | 222/56 |
| 4,076,145 | 2/1978 | Zygiel | 222/1 |
| 4,083,200 | 4/1978 | Luxem | 62/342 |
| 4,143,793 | 3/1979 | McMillin et al. | 222/1 |
| 4,181,242 | 1/1980 | Zygiel et al. | 222/1 |
| 4,201,558 | 5/1980 | Schwitters et al. | 62/70 |
| 4,216,879 | 8/1980 | McMillin | 222/1 |
| 4,218,014 | 8/1980 | Tracy | 239/106 |
| 4,221,117 | 9/1980 | Martineau | 62/306 |
| 4,275,567 | 6/1981 | Schwitters | 62/63 |
| 4,383,417 | 5/1983 | Martineau | 62/127 |

(List continued on next page.)

FOREIGN PATENT DOCUMENTS

| | | | |
|---|---|---|---|
| 0250245 | 12/1987 | European Pat. Off. | 43/46 |
| 59-98653 | of 1984 | Japan . | |

OTHER PUBLICATIONS

The Cornelius Company, FCB (Solid-State) Post-Mix Dispenser Two-Flavor/Hot-Gas Defrost Service Manual, Apr. 24, 1989.

*Primary Examiner*—William E. Wayne

[57] ABSTRACT

An apparatus and method are provided for controlling the consistency and quality of a frozen carbonated beverage product made by mixing several ingredients including syrup, water and carbon dioxide in a mixing chamber of a frozen carbonated beverage machine. The apparatus includes a process flow block that controls the flow of the ingredients from ingredient supply sources to the mixing chamber. A pair of transducers are also provided for measuring the pressure of carbon dioxide being injected into the mixing chamber and the pressure of the product in the mixing chamber. A central processing unit communicates the measured pressures to an EPROM which employs an algorithm for determining a low set point pressure value and a high set point pressure value based upon the pressure of carbon dioxide being injected into the mixing chamber. A pair of solenoids are also provided which control the supply of the ingredients into the mixing chamber in response to command signals from the central processing unit. The central processing unit instructs one or both of the solenoids to open so as to supply the mixing chamber with one or more of the ingredients when the pressure in the mixing chamber is below the low set point pressure value and to close so as to cut off the supply of one or more of the ingredients to the mixing chamber when the pressure in the mixing chamber is above the high set point pressure value.

26 Claims, 6 Drawing Sheets

U.S. PATENT DOCUMENTS

| | | | |
|---|---|---|---|
| 4,393,659 | 7/1983 | Keyes et al. | 62/66 |
| 4,580,905 | 4/1986 | Schwitters et al. | 366/149 |
| 4,625,525 | 12/1986 | Bradbury et al. | 62/330 |
| 4,653,281 | 3/1987 | Van Der Veer | 62/71 |
| 4,653,928 | 3/1987 | Bravo | 366/149 |
| 4,736,593 | 4/1988 | Williams | 62/136 |
| 4,825,876 | 5/1989 | Beard | 128/675 |
| 4,831,839 | 5/1989 | Anderson et al. | 62/308 |
| 4,869,072 | 9/1989 | Sexton et al. | 62/136 |
| 4,878,760 | 11/1989 | Newton et al. | 366/149 |
| 5,056,325 | 10/1991 | Josten et al. | 62/126 |
| 5,095,710 | 3/1992 | Black et al. | 62/68 |
| 5,103,649 | 4/1992 | Kieffer | 62/136 |
| 5,158,506 | 10/1992 | Kusano et al. | 62/136 |
| 5,212,954 | 5/1993 | Black et al. | 62/73 |
| 5,226,450 | 7/1993 | Lambourn | 137/607 |
| 5,473,909 | 12/1995 | Kateman et al. | 62/306 |
| 5,537,914 | 7/1996 | Gibney et al. | 99/323.2 |

APPARATUS AND METHOD FOR CONTROLLING THE CONSISTENCY AND QUALITY OF A FROZEN CARBONATED BEVERAGE PRODUCT

BACKGROUND OF THE INVENTION

1. Field of the Invention

This invention relates generally to frozen carbonated beverage machines and more particularly to an apparatus and method for controlling the consistency and quality of a frozen carbonated beverage product.

2. Background Art

Frozen carbonated beverage machines are known in the art and have been used for years. These devices produce a frozen carbonated beverage by freezing a mixture of ingredients including syrup, water and carbon dioxide in a mixing chamber. The mixture freezes on the inner surface of the mixing chamber which is surrounded by a helical coil through which a refrigerant passes. A rotating shaft is disposed inside the chamber which has a plurality of outwardly projecting blades that scrape the mixture off the inside wall of the mixing chamber. Once the carbonated beverage is in the desired frozen state, the product is dispensed from the chamber through a product valve.

The temperature and viscosity of the ingredients within the mixing chamber are maintained by a control system which controls the refrigeration system. The control system also controls the amount of the ingredients injected into the mixing chamber so as to maintain the quantity of such ingredients within the chamber at a prescribed amount. Such control systems typically include a pressure responsive device which controls the amount of ingredients fed into the chamber in response to chamber pressure.

The pressure of the carbon dioxide within the chamber is maintained above atmospheric pressure, and the temperature of the liquid within the chamber is maintained below the freezing point of water at atmospheric pressure, but above the temperature where the liquid readily freezes at the pressure within the chamber. The viscosity of the liquid must also be maintained within prescribed limits. Under these conditions of temperature and pressure and with the viscosity suitably maintained, the beverage is dispensed from the chamber through the product valve to atmospheric pressure, in a semi-frozen state similar to frozen foam.

The volume of the product dispensed from the mixing chamber is defined as "overrun". A liquid which doubles its volume when it is dispensed from the mixing chamber in a semi-frozen state is defined as having an overrun of 100%. Typically, the more carbon dioxide that is added to the mixing chamber, the higher the overrun. From a productivity standpoint, it is desirable to be able to produce high overruns. From a quality standpoint, it is desirable to be able to control overrun so that the consistence of the product can be maintained.

The quality of the product is also determined by the ratio of the mixture of the syrup, water, and carbon dioxide content. The ability to control and adjust the mixture is a function of the ability to accurately monitor and control pressures, temperatures, and carbon dioxide content. While other factors such as syrup content also affect the quality of the product, the amount of carbonation is the primary factor. A major drawback of known frozen carbonated beverage machines is their inability to maintain proper control over the pressures, temperatures and the carbon dioxide content entering the mixing chamber, so as to produce a consistently high quality product. This is particularly the case when high volumes of product are being drawn from the machine.

The quality of the product is further maintained by being able to quickly freeze the product and periodically defrost the mixing chamber at set intervals. The faster the freeze down and defrost cycles can be completed, the higher the output capabilities of the machine. Known frozen carbonated beverage machines take approximately 8 minutes to freeze down following a defrost cycle. It is desirable to reduce this time.

In one known frozen carbonated beverage machine manufactured by the Mitchell Company, the syrup and water are injected into the mixing chamber together with the carbon dioxide. In this device the scrapper blades remove the frozen product from the walls of the chamber and agitate the mixture so as to "whip" the carbon dioxide into the solution. A drawback of this device is that when product is continuously being drawn from the mixing chamber, it is difficult to control the correct amount of carbon dioxide being injected into the chamber. The injection of the water, syrup and carbon dioxide mixture is controlled by means of a pressure switch that opens on low pressure and fills to a set cut off pressure. The pressure in this type of system has a tendency to cycle from a low set point of approximately 30 psi to as high as 70 psi. Such fluctuation in pressures results in an inconsistent product. Thus, while this type of machine has the ability to produce overruns higher than 100%, it is limited in its ability to maintain a consistent product during high and low volume periods of production.

In another known frozen carbonated beverage machine, a precarbonated water (produced by an external carbonator) is introduced along with the syrup into the mixing chamber. The process in this machine is also controlled by means of a simple pressure switch that senses low pressure and opens syrup and water solenoids allowing the mixing chamber to fill until the set pressure is reached. This mixture has a tendency to rise to high pressures as the mixing chamber is cooled. In this machine, the overpressure is controlled by means of an expansion chamber in conjunction with a relief valve that allows the mixture to flow back into the mixing chamber. The pressure in the expansion chamber is maintained at atmospheric or chamber pressure. This provides a closer control of overpressure by limiting the maximum pressure and preventing the pressure from rising to such a high level. A drawback of this type of machine, however, is that it cannot produce high overrun amounts. The overrun in this type of machine is typically only between 20% and 80%.

The present invention is directed to an improved frozen carbonated beverage machine which overcomes, or at least minimizes, some of these problems.

SUMMARY OF THE INVENTION

In accordance with one aspect of the present invention, an apparatus is provided for controlling the consistency and quality of a frozen carbonated beverage made by mixing several ingredients including syrup, water and carbon dioxide in a mixing chamber of a frozen carbonated beverage machine. The apparatus includes a process flow block that controls the flow of the ingredients from ingredient supply sources to the mixing chamber. A pair of transducers are also provided for measuring the pressure of carbon dioxide being supplied to the mixing chamber and the pressure of the product in the mixing chamber. A central processing unit (CPU) communicates these measured pressures to an EPROM which employs an algorithm for determining a low set point pressure value and a high set point pressure value based upon the pressure of carbon dioxide being supplied to the mixing chamber. The low and high set point values are based upon the setting on a manual $CO_2$ regulator which controls the supply of pressure into the mixing chamber. A transducer measures the pressure exiting the $CO_2$ regulator and communicates this pressure reading to the CPU.

The algorithm selects the low set point pressure value and the high set point pressure value based upon a low set point operating pressure and a high set point operating pressure which are stored in the EPROM and may be varied by the operator of the machine. The algorithm subtracts the low set point operating pressure from the pressure of carbon dioxide being supplied to the mixing chamber to arrive at the low set point pressure value. The algorithm also subtracts the high set point operating pressure from the pressure of carbon dioxide being supplied to the mixing chamber to arrive at the high set point pressure value. The EPROM stores default low and high set point operating pressures, which are preferably 5 psi and 3 psi, respectively. However, these values can be modified by the operator based upon empirical test data which produces optimum product consistency and quality.

The system works as follows. First, the pressure of carbon dioxide being injected into the mixing chamber is measured by a pressure transducer which communicates this reading to the CPU. A typical reading for example is 35 psi. The CPU then employs the algorithm stored in the EPROM to calculate the low and high set point pressure values. Thus, the low set point operating pressure of 5 psi is subtracted from the 35 psi $CO_2$ pressure reading to arrive at a low set point pressure value of 30 psi. Correspondingly, the high set point operating pressure of 3 psi is subtracted from the 35 psi $CO_2$ pressure reading to arrive at a high set point pressure value of 32 psi. The CPU instructs one or more solenoids which are provided to control the injection of the ingredients into the mixing chamber to open when the pressure in the mixing chamber, as measured by a pressure transducer, is below 30 psi, and to close when the pressure in the mixing chamber is above 32 psi.

This allows the CPU to continuously maintain a specific and very accurate pressure differential between the carbon dioxide injection pressure and the fill pressure and stop fill pressure. This in turn defines a very accurate pressure range in which the mixing chambers will operate. In other existing systems, the fill pressures are set by limit switches which are inaccurate and carbon dioxide injection is controlled by a pressure regulator which is also inaccurate. The result is a fluctuating mixing chamber pressure and fluctuating carbon dioxide injection amounts. This produces widely varying and poorly controlled product quality when product is being dispensed at varying rates.

An additional feature is that when the pressures in the mixing chambers are low, a low overrun product is produced and when the pressures in the mixing chambers are high, a high overrun product is produced with great consistency. In order to raise or lower the pressures in the mixing chambers, it is only necessary to manually raise or lower the $CO_2$ regulator pressure. The CPU automatically adjusts the chamber pressures to the set points obtained from the EPROM based upon the corresponding higher or lower $CO_2$ regulator pressure.

In accordance with another aspect of the present invention, a method is provided for controlling the consistency and quality of a frozen carbonated beverage product. The method includes the steps of (1) measuring the pressure of carbon dioxide being supplied to the mixing chamber; (2) selecting a low set point value and a high set point value based on the pressure of carbon dioxide being supplied to the mixing chamber; (3) measuring the pressure of the frozen carbonated beverage in the mixing chamber; and (4) injecting one or more of the ingredients into the mixing chamber when the pressure in the mixing chamber is below the low set point value and cutting off the supply of one or more of the ingredients to the mixing chamber when the pressure in the mixing chamber is above the high set point value. The method further includes the step of controlling the flow of the ingredients from ingredient supply sources into the mixing chamber.

BRIEF DESCRIPTION OF THE DRAWINGS

Other aspects and advantages of the present invention will become apparent upon reading the following detailed description and upon reference to the drawings in which.

DETAILED DESCRIPTION OF THE PREFERRED EMBODIMENTS

Figure 1:
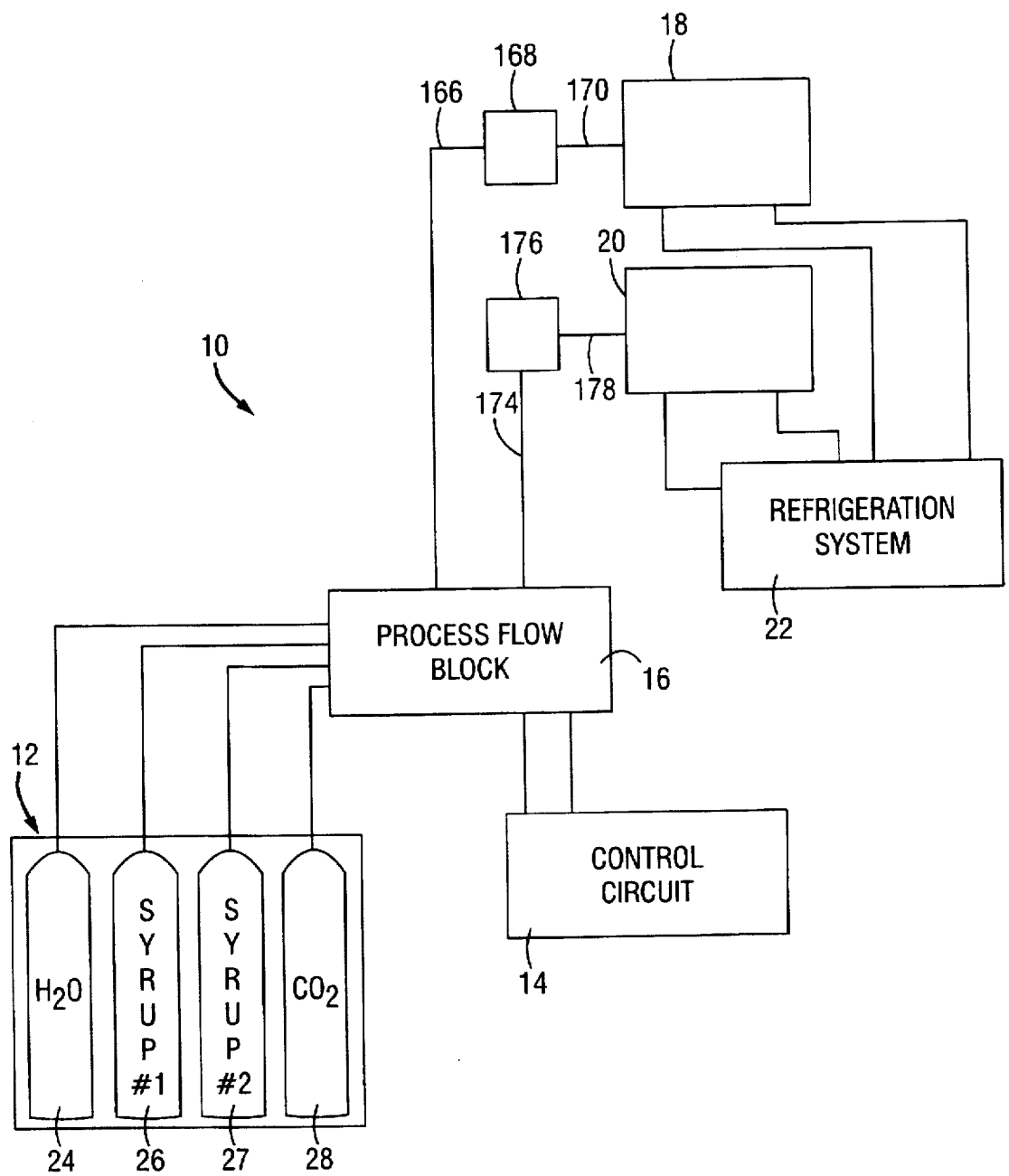
FIG. 1 is a schematic diagram of the basic components of a frozen carbonated beverage machine according to the present invention.

Turning now to the drawings and referring initially to FIG. 1, a system diagram of a frozen carbonated beverage machine according to the present invention is shown generally by reference numeral 10. The system 10 includes an ingredient supply source 12, a control circuit 14, a process flow block 16, a pair of mixing chambers 18 and 20 and a refrigeration system 22. The ingredient supply source 12 includes a water supply tank 24, a pair of syrup supply tanks 26 and 27 (for two different flavors) and a carbon dioxide tank 28.

Figure 2A:
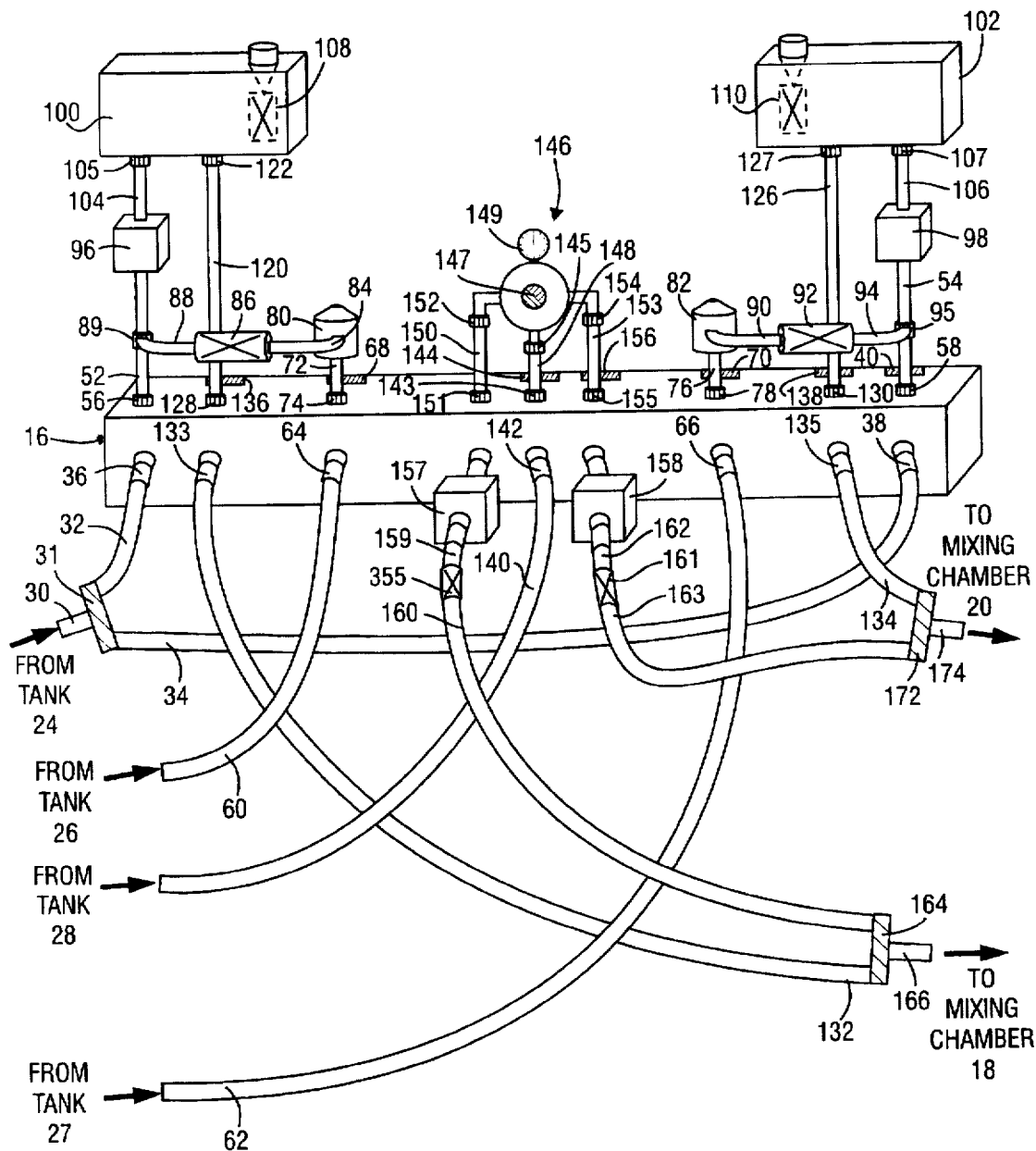
FIG. 2A is a detailed diagram of one embodiment of a process flow block according to the present invention.

Water is supplied from the water supply tank 24 to the process flow block 16 via a supply hose 30 which via a "T" connector 31 branches off into two separate supply hoses 32 and 34, as shown in FIG. 2A. Supply hose 32 feeds into the left side of the process flow block 16, while supply hose 34 feeds into the right side of the process flow block 16, as shown in FIG. 2A. As will be further explained below, the left side of the process flow block 16 controls the flow of the ingredients into the mixing chamber 18 and the right side of the process flow block 16 controls the flow of the ingredients into the mixing chamber 20.

The supply hose 32 is mounted to the process flow block 16 via a coupling 36 which is press-fit into an inlet formed in the process flow block, as shown in FIG. 2A. Similarly, the supply hose 34 is mounted to the process flow block 16 via a coupling 38 which is also press-fit into an inlet formed in the process flow block. The water exits the process flow block 16 via outlets which are disposed on an adjacent face of the process flow block at an angle of 90 degrees. A transducer 40 is mounted on the right side of the process flow block 16 to monitor the pressure of the water flowing through the process flow block 16. Since the water is being supplied to the block 16 from the same source, only one transducer is needed. As those of ordinary skill in the art will appreciate, the transducer 40 could alternatively be placed on the left side of the process flow block 16.

Figure 3:
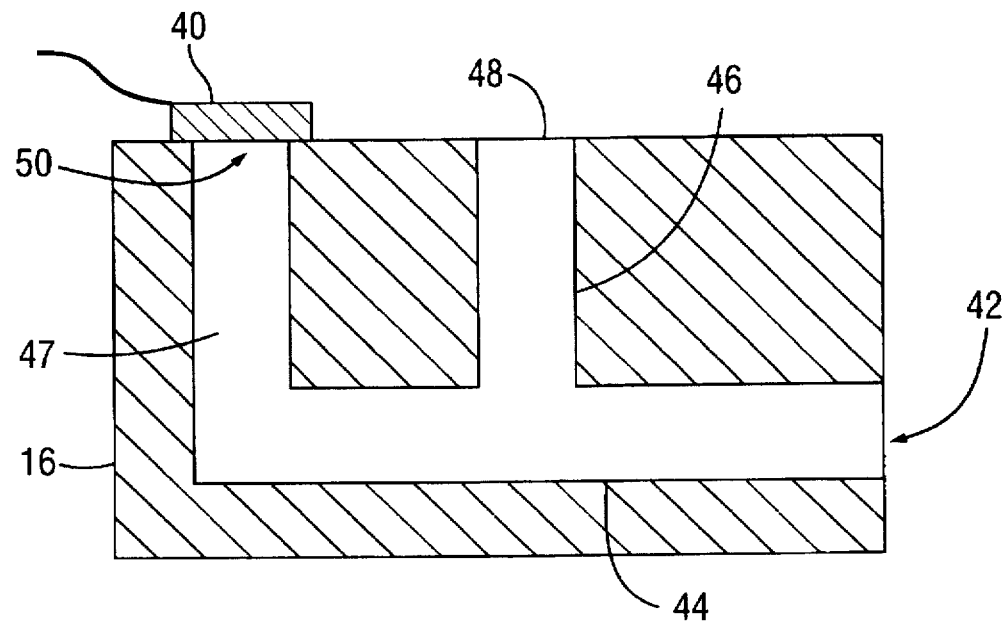
FIG. 3 is a representational flow path showing the flow of one of the ingredients through the process flow block shown in FIG. 2A.

The flow of the water through the process flow block 16 can best be seen in FIG. 3. The flow of the water on the right side of the process flow block 16 is illustrated, because as will be seen, this same flow arrangement is used for the flow of the other ingredients through the flow block 16. The water enters the process flow block 16 through an inlet 42. It then travels through flow channel 44 which branches off into flow channels 46 and 47. The water exits the process flow block 16 through an outlet 48 which is disposed at the end of flow channel 46. The flow channel 47 leads to an outlet 50. The transducer 40 is mounted to the process flow block 16 adjacent the outlet 50. This placement of the transducer 40 allows it to read the pressure of the water flowing through the process flow block 16.

Returning to FIG. 2A, the water flows out of the process flow block 16 and into tubes 52 and 54. The tube 52 is disposed on the left side of the process flow block 16 and the tube 54 is disposed on the right side of the process flow block. A pair of couplings 56 and 58 connect the tubes 52 and 54, respectively, to the process flow block 16. The couplings 56 and 58 are preferably press-fit into the block 16.

Syrup No. 1 is supplied from syrup supply tank 26 to the process flow block 16 via a supply hose 60 which feeds into the left side of the process flow block 16. Syrup No. 2 is supplied from syrup supply tank 27 to the process flow block 16 via a supply hose 62 which feeds into the right side of the process flow block. The supply hose 60 is mounted to the process flow block 16 via a coupling 64 which is press-fit into an inlet formed in the process flow block. Similarly, the supply hose 62 is mounted to the process flow block 16 via a coupling 66 which is also press-fit into an inlet formed in the process flow block. The syrups exit the process flow block 16 via outlets which are disposed on the adjacent face of the flow block at an angle of 90 degrees. A transducer 68 is mounted on the left side of the process flow block 16 to monitor the pressure of the syrup No. 1 flowing through the process flow block 16 and a transducer 70 is mounted on the right side of the process flow block 16 to monitor the pressure of syrup No. 2 flowing through the process flow block. As syrup No. 1 exits the process flow block 16 through the outlet it enters a tube 72. The tube 72 is mounted to the process flow block 16 via a coupling 74 which is preferably press-fit into the process flow block. Similarly, as syrup No. 2 exits the process flow block 16 through the outlet it enters a tube 76. The tube 76 is also mounted to the process flow block via a coupling 78 which is preferably press-fit into the block.

A pair of brix adjusters 80 and 82 are attached to the tubes 72 and 76, respectively. The brix adjusters 80 and 82 control the amount of syrup that is mixed with the water. These devices are manually adjusted. Since they are well known in the art, they will not be further described herein.

After syrup No. 1 passes through the brix adjuster 80, it passes through a tube 84 to a check valve 86 which prevents the syrup from flowing back into the brix adjuster 80, i.e., it is a one-way directional valve. After syrup No. 1 passes through the check valve 86, it passes through a tube 88 which is coupled to tube 52 via a coupling 89. At the point where tubes 52 and 88 join, the syrup No. 1 mixes with the water being supplied to the left side of the process flow block 16. Similarly, after syrup No. 2 passes through the brix adjuster 82, it passes through a tube 90 to a check valve 92 which prevents the syrup from flowing back into the brix adjuster 82. After syrup No. 2 passes through the check valve 92 it passes through a tube 94 which is coupled to tube 54 via a coupling 95. At the point where tubes 54 and 94 join, the syrup No. 2 mixes with the water being supplied to the right side of the process flow block 16.

A pair of solenoids 96 and 98, which are activated by the control circuit 14, as will be further explained below, control the flow of the syrup/water mixtures into the mixing chambers 18 and 20. The solenoid 96 controls the flow of the syrup No. 1/water mixture in mixing chamber 18 and the solenoid 98 controls the flow of the syrup No. 2/water mixture into mixing chamber 20. When the solenoids 96 and 98 are instructed to open, the syrup/water mixtures flow into secondary flow blocks 100 and 102, via tubes 104 and 106, respectively, which are mounted to the flow blocks 100 and 102 via press-fit couplings 105 and 107, respectively. It should be understood that each of the solenoids 96 and 98 is independently controlled. Sample valves 108 and 110 are provided at the secondary flow blocks 100 and 102, respectively, for sampling the syrup/water mixtures. The taste of the mixtures can be varied by adjusting the brix adjusters 80 and 82.

Figure 4:
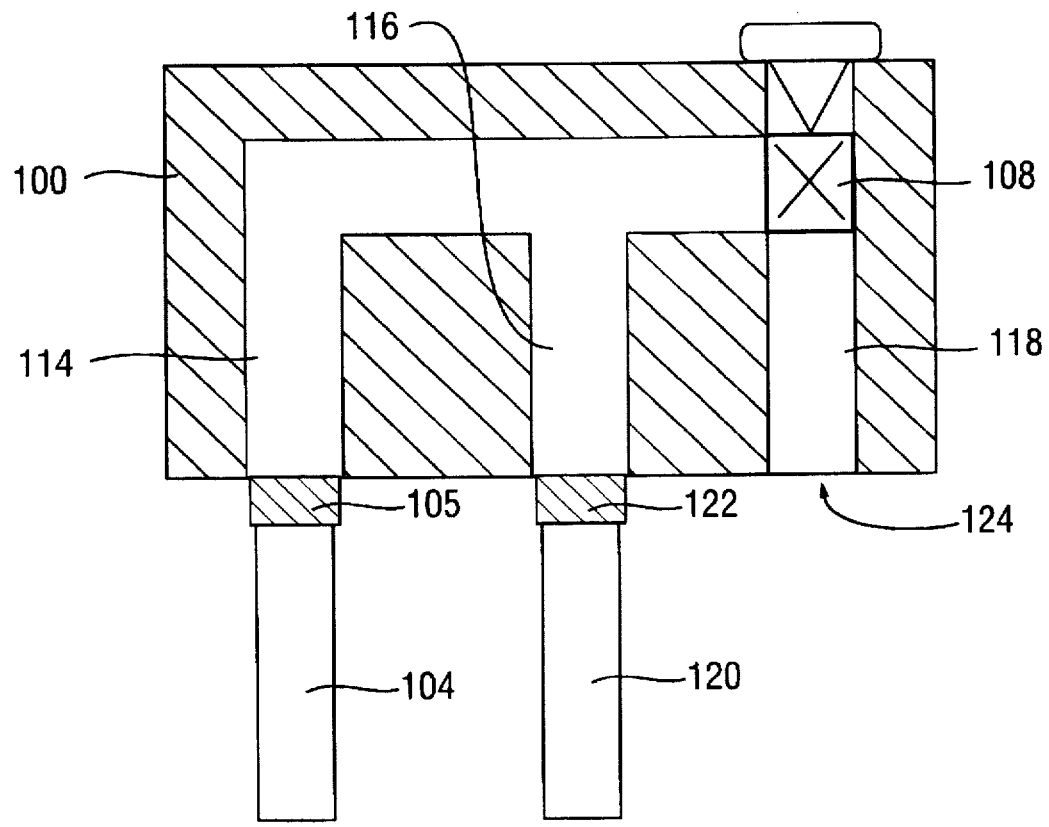
FIG. 4 is a representational flow path showing the flow of a solution containing a mixture of syrup and water through one of the secondary flow blocks according to the present invention.

The flow path of the syrup No. 1/water mixture through the secondary flow block 100 is shown in greater detail in FIG. 4. Since the secondary flow blocks 100 and 102 are identical, only the detail of one of the blocks will be illustrated. The syrup No. 1/water mixture enters the secondary flow block 100 via tube 104. Once inside the secondary flow block 100, the syrup No. 1/water mixture flows through a flow channel 114 which branches off into two separate flow channels 116 and 118. Flow channel 116 directs the syrup No. 1/water mixture out of the secondary flow block 100 into a tube 120 which in turn delivers the mixture to the process flow block 16. The tube 120 is coupled to the secondary flow block 100 via coupling 122 which is press-fit into block 100. Flow channel 118 channels the mixture out of the secondary flow block 100 into the atmosphere. The mixture exits the secondary flow block 100 through exit port 124. Sample valve 108 is disposed within flow channel 118 and regulates the flow of the mixture out of the secondary flow block 100 into the atmosphere. Preferably, a cup is placed beneath the exit port 124 when it is desired to dispense a sample of the mixture so as to collect the sample mixture being dispensed.

Similarly, a tube 126 connected to the secondary flow block 102 via press-fit coupling 127 transfers the syrup No. 2/water mixture from the secondary flow block 102 to the process flow block 16, as shown in FIG. 2A. The tubes 120 and 126 are mounted to the process flow block 16 via couplings 128 and 130, respectively, which are press-fit into inlet ports in the process flow block.

The syrup No. 1/water mixture exits the process flow block 16 through an exit port which is disposed on the face of the process flow block adjacent to the inlet port at an angle of 90 degrees. A hose 132, which is coupled to the process flow block 16 via a press-fit coupling 133, delivers the syrup No. 1/water mixture from the process flow block to the mixing chamber 18 as further described below.

The syrup No. 2/water mixture also exits the process flow block 16 through an exit port which is disposed on the face of the process flow block adjacent to the inlet port at an angle of 90 degrees. Similarly, a hose 134, which is coupled to the process flow block 16 via a press-fit coupling 135, delivers the syrup No. 2/water mixture from the process flow block to the mixing chamber 20.

A pair of transducers 136 and 138 are mounted to the process flow block 16 to monitor the respective pressures of the syrup No. 1/water mixture and the syrup No. 2/water mixture flowing through the process flow block.

Carbon dioxide is supplied from the carbon dioxide supply tank 28 to the process flow block 16 via a supply hose 140. The carbon dioxide supply hose 140 feeds into the center of the process flow block 16. The supply hose 140 is mounted to the process flow block 16 via a coupling 142 which is press-fit into an inlet formed in the process flow block. The carbon dioxide exits the process flow block 16 via an outlet which is disposed on the adjacent face of the flow block at an angle of 90 degrees. A transducer 144 is mounted on the process flow block 16 in the manner previously described to monitor the pressure of the carbon dioxide flowing into the process flow block 16 from the supply tank 28.

After the carbon dioxide exits the process flow block 16 it flows to a $CO_2$ regulator valve 146 via a tube 148 which is mounted to the process flow block 16 via a press-fit coupling 143 and coupled to the $CO_2$ regulator valve via a coupling 145. The $CO_2$ regulator valve 146 can be manually adjusted and is provided to adjust the pressure of the carbon dioxide which is supplied to the mixing chambers 18 and 20. The pressure of the carbon dioxide flowing into the process flow block 16 from the carbon dioxide supply tank is approximately 60–70 psi. The pressure of the carbon dioxide being supplied to the mixing chambers 18 and 20 should be approximately 30–40 psi for normal overrun and product consistency. The $CO_2$ regulator valve 146 is used to set this pressure. A control nob 147 on the $CO_2$ regulator 146 is used to adjust the pressure. A gauge 149 is provided for displaying the pressure of the carbon dioxide exiting the $CO_2$ regulator valve 146.

The reduced pressure carbon dioxide exits the $CO_2$ regulator valve 146 via two separate paths both of which deliver the carbon dioxide back to the process flow block 16. Path No. 1 delivers the carbon dioxide to the left side of the process flow block 16 via a copper tube 150 which is coupled to the process flow block and the $CO_2$ regulator valve 146 via couplings 151 and 152 respectively. Path No. 2 delivers the carbon dioxide to the right side of the process flow block 16 via a copper tube 153 which is coupled to the process flow block and the $CO_2$ regulator valve 146 via press-fit couplings 154 and 155, respectively. The reduced carbon dioxide exits the process flow block 16 via a pair of outlets which are disposed on the adjacent face of the flow block at an angle of 90 degrees.

A transducer 156 is mounted on the right side of the process flow block 16 in the flow path through which the carbon dioxide traveling along Path No. 2 flows. The transducer 156 is mounted in the manner previously described and monitors the pressure of the carbon dioxide flowing into the mixing chambers 18 and 20. Since the pressure of the reduced pressure carbon dioxide is the same along both path No. 1 and path No. 2, only one transducer is needed. As those of ordinary skill in the art will appreciate, the transducer 156 could alternatively be mounted on the left side of the process flow block 16 in flow Path No. 1.

A pair of solenoids 157 and 158 are mounted at the exit ports of the process flow block 16 where the low pressure carbon dioxide exits the process flow block. The solenoids 157 and 158 control the supply of the reduced pressure carbon dioxide into the mixing chambers 18 and 20, respectively. As will be further explained below the control circuit 14 controls the activation of the solenoids 157 and 158. A check valve 355 is coupled to the solenoid 157 via a tube 159. A hose 160 is in turn coupled to the check valve 355 and delivers the reduced pressure carbon dioxide from the left side of the process flow block 16 to the mixing chamber 18. Similarly, a check valve 161 is coupled to the solenoid 158 via a tube 162. A hose 163 is in turn coupled to the check valve 161 and delivers the reduced pressure carbon dioxide from the right side of the process flow block 16 to the mixing chamber 20.

More precisely, the hose 160 connects with the hose 132, which delivers the combined syrup No. 1/water mixture to the mixing chamber 18, at a "T" connector 164. The syrup No. 1/water mixture combines with the reduced pressure carbon dioxide at the "T" connector 164 so that the combined syrup No. 1/water/reduced pressure carbon dioxide mixture is delivered to the mixing chamber 18 via hose 166, as shown in FIG. 2A. The "T" connector 164 therefore joins the hoses 132, 160, and 166 together. The hose 166 is coupled to an expansion chamber 168 (shown in FIG. 1) which accumulates excess product when the pressure in the mixing chamber rises above a certain point. The expansion chamber 168 operates to moderate the pressure in the mixing chamber 18 so that it does not get too high. A hose 170 delivers the mixture from the expansion chamber 168 to the mixing chamber 18. The couplings of the hoses 166 and 170 to the expansion chamber 168 and the mixing chamber 18 are well known in the art.

Similarly, the hose 163 connects with the hose 134, which delivers the combined syrup No. 2/water mixture to the mixing chamber 20, at a "T" connector 172, as shown in FIG. 2A. The syrup No. 2/water mixture combines with the reduced pressure carbon dioxide at the "T" connector 172 so that the combined syrup No. 2/water/reduced pressure carbon dioxide mixture is delivered to the mixing chamber 20 via hose 174. The "T" connector therefore joins the hoses 134, 163, and 174 together. The hose 174 is coupled to an expansion chamber 176 (shown in FIG. 1) which is identical to expansion chamber 168. A hose 178 delivers the mixture from the expansion chamber 176 to the mixing chamber 20. The couplings of the hoses 174 and 178 to the expansion chamber 176 and the mixing chamber 20 are well known in the art.

The preferred materials and components are also follows: All the tubes are made of a stainless steel, except tubes 148, 150 and 153 which are made of copper. The process flow block 16 and the secondary flow blocks 100 and 102 are formed of a plastic material, preferably Delrin®. The pressure transducers are preferably Motorola part no. MPX2700D; the solenoids are preferably selected from the following: ALCO part no. 204CD 1/4S 5/32-AMS 24/50–60, or Sirai Electromeccanica S. R. L. part nos. L171-B13-Z 723A-24 VAC/60 and PL171-B13-Z723A-24VAC/60. The $CO_2$ regulator valve 146 is preferably a Wilkerson part no. RO4-01N00. All press-fit couplings are preferably ¼" stainless steel fittings manufactured by Chudnow Manufacturing. All hoses are preferably ¼" vinyl tubing with stainless steel braid coating (part no. AV4) manufactured by Chudnow Manufacturing. The brix valves are preferably part no. 310-198-133 manufactured by the Cornelius company. The check valves are preferably ¼"

stainless steel ball check valves (part no. S470-44) manufactured by Chudnow Manufacturing.

Figure 5A:
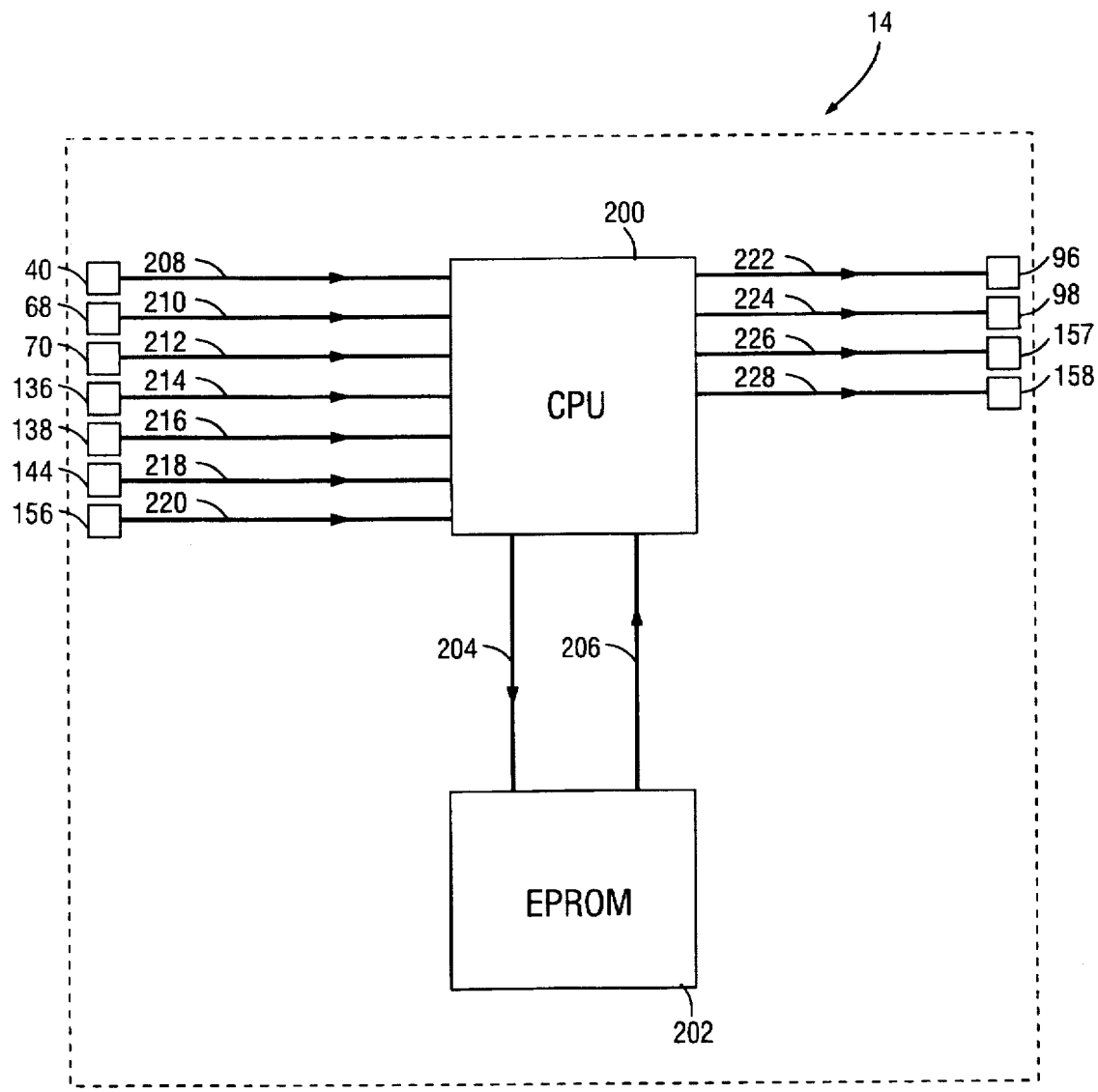
FIG. 5A is a schematic diagram of a control circuit which controls the flow of ingredients into the mixing chambers in the embodiment of the present invention shown in FIG. 2A.

At the heart of the process control is the control circuit 14. A detailed schematic drawing of the control circuit 14 is shown in FIG. 5A. The control circuit 14 includes a CPU (central processing unit) 200, an EPROM (Erasable Programmable Read Only Memory) 202, and a series of inputs and outputs. The CPU 200 and the EPROM 202 are connected to one another via communication lines 204 and 206. The CPU 200 is preferably Motorola part no. 68HC811 and the EPROM is preferably SGS Thompson pan no. M27/C512. The inputs into the CPU 200 include pressure readings from the transducers 40, 68, 70, 136, 138, 144 and 156 and the outputs include control signals to the solenoids 96, 98, 157 and 158. The pressure transducers 40, 68, 70, 136, 138, 144, and 156 are connected to the CPU 200 via communication lines 208, 210, 212, 214, 216, 218, and 220, respectively. The solenoids 96, 98, 157, and 158 are connected to the CPU 200 via communication lines 222, 224, 226, and 228, respectively. The CPU 200 receives numerous other inputs including motor loads and temperature readings and transmits numerous other output signals including compressor on/off instructions, condenser on/off instructions, mixing motor on/off instructions which are not directly relevant to the present invention and therefore will not be discussed further herein.

The transducers 40, 68, 70, and 144 measure the pressures of the water, syrup No. 1, syrup No. 2, and carbon dioxide, respectively, being supplied to the system. The CPU 200 monitors these readings to determine whether any of the corresponding supply tanks 24, 26, 27, or 28 need to be replaced. More specifically, the CPU 200 shuts the machine down if the pressure of any of the ingredients flowing into the process flow block 16 drops below a certain low set point value, e.g., 45 psi, which can be selected by the operator. The set point values can be inputted by the operator via a keypad (not shown). As the machine is shut down, the operator is informed via a visual display panel (not shown) that the depleted ingredient(s) needs to be replaced. After the depleted ingredient(s) is replenished and once all the supply pressures reach a certain high set point value, e.g., 50 psi, again selectable by the operator, the CPU 200 turns the machine back on.

A description of the process flow follows. For simplicity sake, the process will be described only with respect to the flow of ingredients into the mixing chamber 18. First, all the settings in the system must be adjusted. This is done by setting the $CO_2$ regulator valve 146 to the desired pressure, which is typically around 35 psi, and by setting the brix adjuster 80 so that the syrup content is at the desired sweetness. The adjustment of the $CO_2$ regulator valve 146 controls the quality of the final product so that: the higher the setting is, the higher the overrun will be, and thus the lighter the product will be; and the lower the setting is, the lower the overrun will be, and thus the heavier and more liquidy the product will be. Setting the $CO_2$ regulator valve 146 to about 35 psi produces an overrun of approximately 100%.

Once the adjustments have been made the system is ready to run. First, the CPU 200 instructs the solenoids 96 and 157 to open via communication lines 222 and 226 (shown in FIG. 5A) so that the syrup No. 1/water mixture and the carbon dioxide can be supplied to the mixing chamber 18. The solenoids 96 and 157 remain open until instructed by the CPU 200 to close. The CPU 200 instructs the solenoids 96 and 157 to close when the pressure in the mixing chamber 18 reaches a high set point pressure value. The CPU 200 determines the pressure in the mixing chamber 18 by reading the pressure measured by the transducer 136, which because it is in a line that communicates directly with the mixing chamber 18, provides a reading of the chamber pressure. The reading from the transducer 136 is communicated to the CPU via communication line 214.

A major departure of the present invention from the prior art is that it sets the high and low set point pressure values for the chamber pressure based upon the pressure of the carbon dioxide leaving the $CO_2$ regulator valve 146. For example, if the pressure of the carbon dioxide is 35 psi, the EPROM 202, which employs an algorithm for determining a low set point pressure value and a high set point pressure value, as explained above, will set the high pressure set point at 32 psi and the low pressure set point at 30 psi. Based upon these settings which are communicated to the CPU 200 from the EPROM 202 via communication line 206, the CPU 200 instructs the solenoids 96 and 157 to open or close depending upon whether the pressure in the mixing chamber 18 is below 30 psi or above 32 psi, respectively. By tying the high and low set point pressure values to the pressure of the carbon dioxide leaving the $CO_2$ regulator vane 146, the consistency of the product is always maintained. If the pressure of the carbon dioxide fluctuates, as it often does due to inaccuracies in the $CO_2$ regulator valve 146, or the supply line pressure, the amount of syrup/water mixture will accordingly be varied and thus maintain the appropriate balance. As will be appreciated by those of ordinary skill in the art, other set point pressure values may be chosen, those discussed herein are merely for exemplary purposes.

The prior an machines use a pressure switch disposed within the mixing chamber to control the amount of syrup/water mixture and carbon dioxide that is injected into the chamber. The drawback of this solution is that the pressure switch is set to a fixed value and thus does not take into account fluctuations in the pressure of the carbon dioxide exiting the $CO_2$ regulator. These pressure fluctuations can be as large as 40 psi. The result is that with these prior art machines, the product becomes too liquidy or too icy if the regulated pressure exiting the $CO_2$ regulator varies too much from its preset value.

Another advantage of the present invention is that the quality of the product can be readily changed without changing the consistency of the product. Simply by increasing the setting on the $CO_2$ regulator to a higher pressure, the overrun can be increased, which results in a foamier/lighter product. Similarly, by decreasing the setting on the $CO_2$ regulator to a lower pressure, the overrun can be decreased, which results in a more liquidy/heavier product. The consistency of the product, however, is maintained because the EPROM 202 commensurately raises (or lowers as the case may be) the set points for the chamber pressure and communicates these changes to the CPU 200 which instructs the solenoid 96 to increase (or decrease) the syrup/water mixture so that it is balanced with the increased (or decreased) carbon dioxide supplied to the chamber. If the carbon dioxide setting on the $CO_2$ regulator is increased or decreased on a prior art machine, the syrup/water mixture is commensurately decreased or increased to maintain the pressure in the chamber within the preset range. This, however, results in a product which is much too icy or much too liquidy.

As those of ordinary skill in the art will appreciate, the injection of the ingredients into the mixing chamber 20 is controlled identically to the way it is for the mixing chamber 18.

Figure 2B:
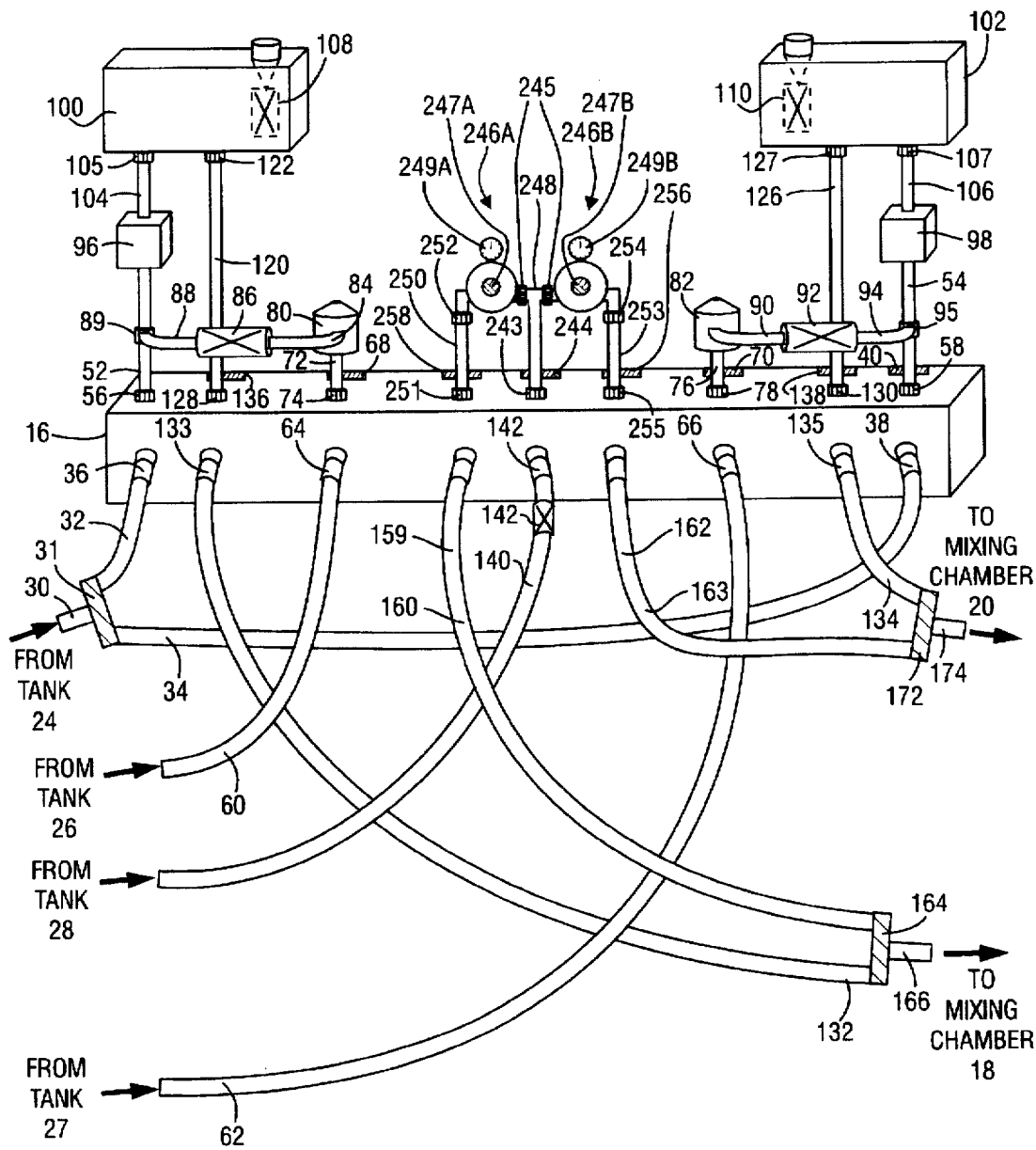
FIG. 2B is a detailed diagram of another embodiment of a process flow block according to the present invention.

In an alternate embodiment, the pressure of the carbon dioxide being injected into each of the mixing chambers 18 and 20 may be individually adjusted, i.e., the pressure of carbon dioxide being injected into mixing chamber 18 may be set to a certain value and the pressure of the carbon dioxide being injected into mixing chamber 20 may be set to a different value. This is accomplished using two separate $CO_2$ regulator valves 246A and 246B, as shown in FIG. 2B.

In this alternate embodiment, carbon dioxide is supplied to the process flow block 16 via supply hose 140. The carbon dioxide exits the process flow block 16 and enters "T" tube 248 which is preferably formed of copper and is mounted to the process flow block 16 via a press-fit coupling 243 and coupled to $CO_2$ regulator valves 246A and 246B via couplings 245. The "T" tube 248 divides the high pressure carbon dioxide into two separate paths. Path No. 1 leads to the $CO_2$ regulator valve 246A which is disposed on the left side of process flow block 16, and Path No. 2 leads to the $CO_2$ regulator valve 246A which is disposed on the right side of the process flow block 16.

The $CO_2$ regulator valve 246A is provided with a control nob 247A which is used to adjust the pressure of the carbon dioxide being supplied into the mixing tank 18. It is also provided with a gauge 249A which displays the pressure of the carbon dioxide exiting the $CO_2$ regulator valve 246A. Similarly, the $CO_2$ regulator 246B is provided with a control nob 247B which is used to adjust the pressure of the carbon dioxide being supplied into the mixing tank 20. It is also provided with a gauge 249B which displays the pressure of the carbon dioxide exiting the $CO_2$ regulator valve 246B.

The lower pressure carbon dioxide is delivered from the $CO_2$ regulator 246A back to the process flow block 16 via copper tube 250 which is coupled to the $CO_2$ regulator 246A with coupling 252 and mounted to the process flow block via press-fit coupling 251. Similarly, the lower pressure carbon dioxide is delivered from the $CO_2$ regulator valve 246B back to the process flow block 16 via copper tube 253 which is coupled to the $CO_2$ regulator valve 246B via coupling 254 and mounted to the process flow block via press-fit coupling 255. Once the low pressure carbon dioxide exits the process flow block 16, it is delivered to the mixing chambers 18 and 20 via the same means discussed with respect to the embodiment in FIG. 2A.

Figure 5B:
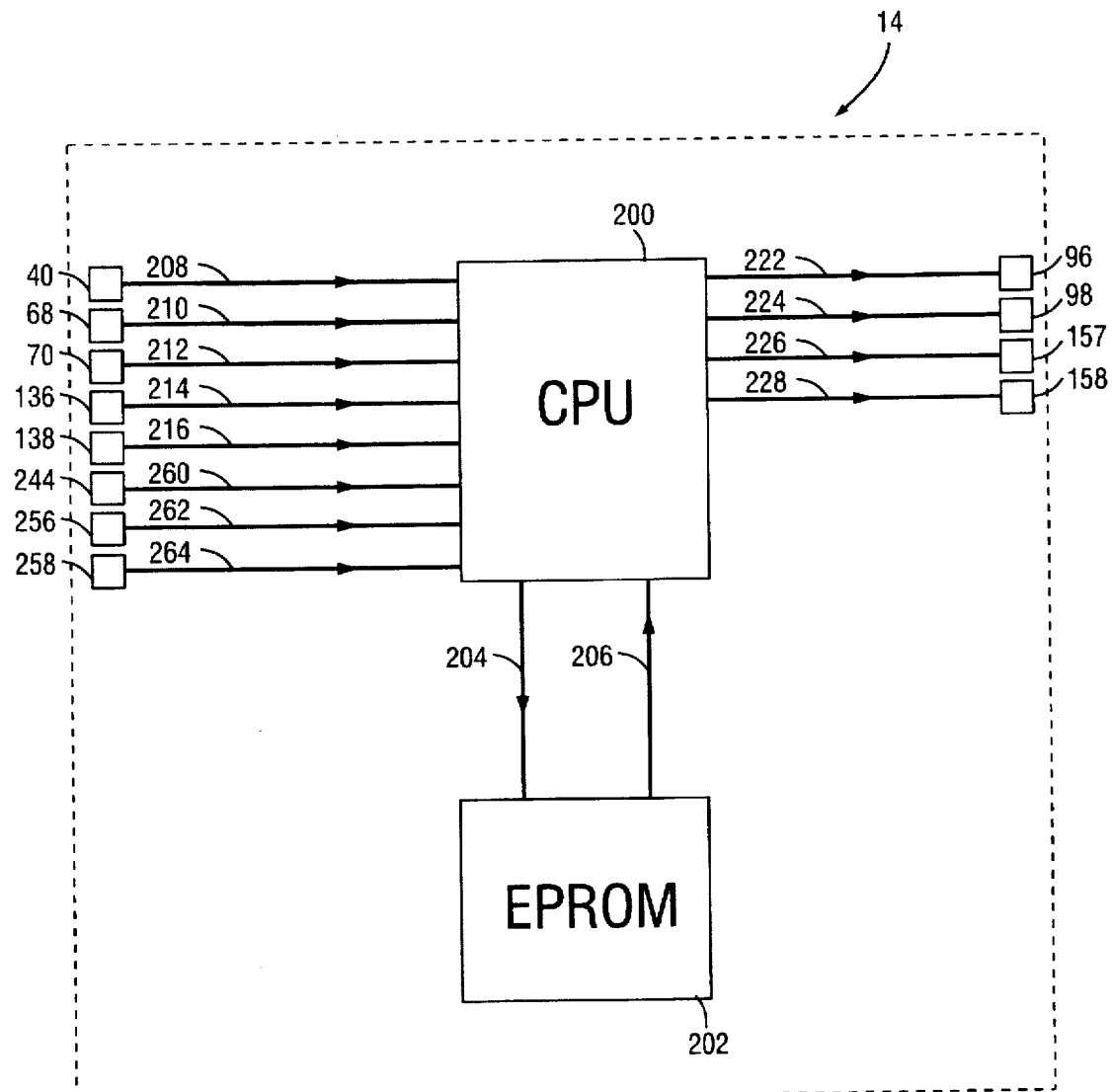
FIG. 5B is a schematic diagram of a control circuit which controls the flow of ingredients into the mixing chambers in the embodiment of the present invention shown in FIG. 2B.

Pressure transducers 244, 256 and 258 are provided for measuring the pressures of the high pressure carbon dioxide being supplied into the process flow block 16, and the two distinct low pressure carbon dioxides exiting the process flow block, respectively. The pressure transducers 244, 256 and 258 are connected to the CPU 200 via communication lines 260, 262 and 264, respectively, as shown in FIG. 5B. The reading from pressure transducer 244 is used by the CPU 200 to determine when the pressure of carbon dioxide being supplied to the process flow block 16 is too low, e.g., below 45 psi, thereby indicating that the supply tank 28 needs to be replaced or refilled as explained above. The readings from the transducers 256 and 258 are used to determine the low set point values and high set point values for the pressure in the mixing chambers 18 and 20, respectively, as also explained above.

With the embodiment shown in FIG. 2B, two different products can be dispensed from the same machine, i.e., two products having different qualities can be dispensed from the same machine. For example, one product can be dispensed which has a high overrun, e.g., over 100%, while at the same time another product can be dispensed which has a low overrun, e.g., 20% or less. This latter product is generally referred to as a frozen uncarbonated beverage. The machine just described therefore can inject more carbon dioxide into one of the mixing chambers than the other. This is accomplished because separate $CO_2$ regulator valves 246A and 246B are used for each of the mixing chambers 18 and 20. More specifically, a product having a high overrun can be produced in mixing chamber 18 by adjusting the control nob 247A to a high setting, e.g., 35 psi or greater, and a product having a low overrun can be produced in mixing chamber 20 by adjusting the control nob 247B to a low setting, e.g., less than 20 psi.

Accordingly, as will be appreciated by those of ordinary skill in the art, a frozen beverage machine incorporating the process flow system shown in FIG. 2B can produce two different (or identical) frozen carbonated beverage products, one frozen carbonated beverage product and one frozen uncarbonated beverage product, or two different (or identical) frozen uncarbonated beverage products and thus is very versatile.

As will be also appreciated by those of ordinary skill in the art, the $CO_2$ regulator in either embodiment can be adjusted so as to increase or decrease the amount of carbon dioxide being injected into the mixing chambers simply be turning the control nob. Accordingly, the overrun can be varied merely by raising or lowering the adjustment on the $CO_2$ regulator. The CPU 200, in conjunction with the EPROM 202, then automatically readjusts the high and low set point pressure values for the pressure in the mixing chamber to maintain a balance in the system and produce a product of corresponding higher or lower overrun.

Those skilled in the art who now have the benefit of the present disclosure will appreciate that the present invention may take many forms and embodiments. For example, the frozen carbonated beverage machine according to the present invention may employ a greater or lesser number of mixing chambers. The components of the system would have to be modified accordingly, but would employ the same basic principles as those of ordinary skill in the art will appreciate. Furthermore, the number of solenoids and transducers can be varied, i.e., more or less components may be provided. For example, a separate solenoid can be provided for controlling the injection of each of the ingredients into each mixing chamber, i.e., three separate solenoids can be provided (one for each of the three ingredients) rather than the two disclosed herein (one for the carbon dioxide and one for the water/syrup mixture). Or, only one solenoid can be provided which controls the injection of all three ingredients into each mixing chamber. It is intended that the embodiments described herein should be illustrative only, and not limiting of the present invention. Rather, it is intended that the invention cover all modifications, equivalents and alternatives falling within the spirit and scope of the invention as defined by the appended claims.

What is claimed is:

1. An apparatus for controlling the consistency and quality of a frozen carbonated beverage product made by mixing several ingredients including syrup, water and carbon dioxide in a mixing chamber of a frozen carbonated beverage machine, said apparatus comprising:

means for measuring the pressure of carbon dioxide being injected into the mixing chamber;

means for selecting a low set point pressure value for the mixing chamber and a high set point pressure value for the mixing chamber based upon the pressure of carbon dioxide being injected into the mixing chamber;

means for measuring the pressure of the frozen carbonated beverage product in the mixing chamber; and means for controlling the injection of the ingredients into the mixing chamber, said control means operating to inject one or more of the ingredients into the mixing chamber when the pressure in the mixing chamber is below the low set point value and cutting off the supply of one or more of the ingredients into the mixing chamber when the pressure in the mixing chamber is above the high set point pressure value.

2. The apparatus for controlling the consistency and quality of a frozen carbonated beverage product according to claim 1, further comprising a process flow block that controls the flow of the ingredients from ingredient supply sources into the mixing chamber.

3. The apparatus for controlling the consistency and quality of a frozen carbonated beverage product according to claim 2, further comprising means for measuring the pressures of each of the ingredients being supplied to the process flow block and means for shutting down the machine when any of the pressures of any of the ingredients reaches a predetermined low set point pressure value.

4. The apparatus for controlling the consistency and quality of a frozen carbonated beverage product according to claim 3, wherein all of the measuring means include transducers that are mounted on the process flow block.

5. The apparatus for controlling the consistency and quality of a frozen carbonated beverage product according to claim 4, wherein the adjusting means includes a $CO_2$ regulator valve.

6. The apparatus for controlling the consistency and quality of a frozen carbonated beverage product according to claim 5, wherein the processor includes a central processing unit and the at least one control valve includes a pair of solenoids, one of the pair controlling the flow of the carbon dioxide into the mixing chamber and the other of the pair controlling the flow of a solution containing a mixture of the syrup and water.

7. The apparatus for controlling the consistency and quality of a frozen carbonated beverage product according to claim 1, wherein the control means includes a processor which receives inputs from both of the measuring means and at least one control valve which is in communication with the processor, the processor instructing the at least one control valve to open when the pressure in the mixing chamber is below the low set point pressure value and to close when the pressure in the mixing chamber is above the high set point pressure value.

8. The apparatus for controlling the consistency and quality of a frozen carbonated beverage product according to claim 1, further comprising means for adjusting the pressure of carbon dioxide being injected into the mixing chamber.

9. The apparatus for controlling the consistency and quality of a frozen carbonated beverage product according to claim 1, wherein the selecting means includes a processor that receives inputs from both measuring means and a programmable memory device in communication with said processor that employs an algorithm for determining the low set point pressure value and the high set point pressure value.

10. The apparatus for controlling the consistency and quality of a frozen carbonated beverage product according to claim 9, wherein the processor includes a central processing unit and the programmable memory device includes an erasable programmable read only memory device.

11. The apparatus for controlling the consistency and quality of a frozen carbonated beverage product according to claim 1, further comprising means for increasing or decreasing the pressure of carbon dioxide being injected into the mixing chamber and correspondingly controlling the amount of other ingredients being injected into the mixing chamber, resulting in higher or lower chamber pressures and levels of overrun.

12. An apparatus for controlling the consistency and quality of a frozen carbonated beverage product made by mixing several ingredients including syrup, water and carbon dioxide in a mixing chamber of a frozen carbonated beverage machine, said apparatus comprising:

a first transducer that measures the pressure of carbon dioxide being injected into the mixing chamber;

a second transducer that measures the pressure of the frozen carbonated beverage product in the mixing chamber;

a programmable memory device employing an algorithm which determines a low set point pressure value for the mixing chamber and a high set point pressure value for the mixing chamber based upon the pressure of carbon dioxide being injected into the mixing chamber;

at least one control valve that controls the injection of one or more of the ingredients into the mixing chamber; and a processor that receives inputs from the first transducer and the second transducer and communicates with the programmable memory device and the at least one control valve.

13. The apparatus for controlling the consistency and quality of a frozen carbonated beverage product according to claim 12, wherein the processor instructs the at least one control valve to open so as to inject the mixing chamber with one or more of the ingredients when the pressure in the mixing chamber is below the low set point pressure value and to close so as to cut off the supply of one or more of the ingredients to the mixing chamber when the pressure in the mixing chamber is above the high set point pressure value.

14. The apparatus for controlling the consistency and quality of a frozen carbonated beverage product according to claim 12, further comprising a process flow block that controls the flow of the ingredients from ingredient supply sources into the mixing chamber.

15. The apparatus for controlling the consistency and quality of a frozen carbonated beverage product according to claim 14, wherein the first and second transducers are mounted on the process flow block.

16. The apparatus for controlling the consistency and quality of a frozen carbonated beverage product according to claim 12, further comprising a $CO_2$ regulator valve for adjusting the pressure of carbon dioxide being injected into the mixing chamber.

17. The apparatus for controlling the consistency and quality of a frozen carbonated beverage product according to claim 12, wherein the at least one control valve includes a pair of solenoids, one of the pair controlling the flow of the carbon dioxide into the mixing chamber and the other of the pair controlling the flow of a solution comprising a mixture of the syrup and the water into the mixing chamber.

18. A method for controlling the consistency and quality of a frozen carbonated beverage product made by mixing several ingredients including syrup, water and carbon dioxide in a mixing chamber of a frozen carbonated beverage machine, said method comprising the steps of:

measuring the pressure of carbon dioxide being injected into the mixing chamber;

selecting a low set point pressure value for the mixing chamber and a high set point pressure value for the mixing chamber based on the pressure of carbon dioxide being injected into the mixing chamber;

measuring the pressure of the frozen carbonated beverage product in the mixing chamber; and injecting one or more of the ingredients into the mixing chamber when the pressure in the mixing chamber is below the low set point pressure value and cutting off the supply of one or more of the ingredients to the mixing chamber when the pressure in the mixing chamber is above the high set point pressure value.

19. The method for controlling the consistency and quality of a frozen carbonated beverage product according to claim 18, further comprising the step of controlling the flow of the ingredients from ingredient supply sources into the mixing chamber.

20. The method for controlling the consistency and quality of a frozen carbonated beverage product according to claim 18, further comprising the step of adjusting the pressure of carbon dioxide being supplied to the mixing chamber.

21. The method for controlling the consistency and quality of a frozen carbonated beverage product according to claim 18, further comprising the step of measuring the pressures of each of the ingredients being supplied to the mixing chamber from ingredient supply sources.

22. The method for controlling the consistency and quality of a frozen carbonated beverage product according to claim 21, further comprising the step of shutting off the machine when the pressure of any of the ingredients being supplied to the mixing chamber from the ingredient supply sources drops below a low set point pressure value.

23. The method for controlling the consistency and quality of a frozen carbonated beverage product according to claim 22, further comprising the steps of replenishing the ingredient whose pressure dropped below the low set point pressure value and turning on the machine when the pressure of all the ingredients being supplied to the mixing chamber from the ingredient supply sources reaches a high set point pressure value.

24. An apparatus for controlling the consistency and quality of a frozen beverage product made by mixing several ingredients including syrup, water and carbon dioxide in a mixing chamber of a frozen carbonated beverage machine having multiple mixing chambers, said apparatus comprising:

means for measuring the pressure of carbon dioxide being injected into each of the mixing chambers;

means for selecting low set point pressure values for each of the mixing chambers and high set point pressure values for each of the mixing chambers based upon the pressure of carbon dioxide being injected into the mixing chambers;

means for measuring the pressure of the frozen beverage product in each of the mixing chambers; and means for controlling the injection of the ingredients into each of the mixing chambers, said control means operating to inject one or more of the ingredients into one or more of the mixing chambers when the pressure in the one or more mixing chambers is below the low set point pressure value and cutting off the supply of one or more of the ingredients into the one or more mixing chambers when the pressure in the one or more mixing chambers is above the high set point pressure value.

25. The apparatus for controlling the consistency and quality of a frozen beverage according to claim 24, wherein the frozen beverage machine has two mixing chambers, each of which is injected with carbon dioxide at a different pressure.

26. The apparatus for controlling the consistency and quality of a frozen beverage according to claim 25, wherein the pressure of carbon dioxide being injected into one mixing chamber is 30 psi or greater, and the pressure of carbon dioxide being injected into the other mixing chamber is 20 psi or less.

* * * * *